(12) United States Patent
Patel et al.

(10) Patent No.: US 9,787,210 B2
(45) Date of Patent: Oct. 10, 2017

(54) PRECHARGING APPARATUS AND POWER CONVERTER

(71) Applicant: Rockwell Automation Technologies, Inc., Mayfield Heights, OH (US)

(72) Inventors: Yogesh P. Patel, Grafton, WI (US); Rangarajan Tallam, Germantown, WI (US); Brian P. Brown, Mayville, WI (US); Jiangang Hu, Grafton, WI (US); James J. Campbell, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 154 days.

(21) Appl. No.: 14/596,351

(22) Filed: Jan. 14, 2015

(65) Prior Publication Data

US 2016/0204709 A1 Jul. 14, 2016

(51) Int. Cl.
  *H02M 5/44* (2006.01)
  *H02H 9/00* (2006.01)
  *H02M 7/12* (2006.01)
  *H02M 1/12* (2006.01)

(52) U.S. Cl.
  CPC .............. *H02M 5/44* (2013.01); *H02H 9/001* (2013.01); *H02H 9/002* (2013.01); *H02M 7/125* (2013.01); *H02M 2001/123* (2013.01)

(58) Field of Classification Search
  CPC .. H02M 5/44; H02M 2001/123; H02H 9/001; H02H 9/002
  See application file for complete search history.

(56) References Cited

U.S. PATENT DOCUMENTS

| | | |
|---|---|---|
| 3,757,197 A | 9/1973 | Bailey |
| 4,039,914 A | 8/1977 | Steigerwald et al. |
| 4,215,304 A | 7/1980 | D'Atre et al. |
| 4,230,979 A | 10/1980 | Espelage et al. |

(Continued)

FOREIGN PATENT DOCUMENTS

| | | |
|---|---|---|
| CN | 201388162 Y | 1/2010 |
| EP | 1091478 A2 | 4/2001 |

(Continued)

OTHER PUBLICATIONS

Blaabjerg, Frede et al., "Single Current Sensor Technique in the DC Link of Three-Phase PWM-VS Inverters: A Review and a Novel Solution", Citations, vol. 33, No. 5, Sep./Oct. 1997, XP-000739841.

(Continued)

*Primary Examiner* — Jue Zhang
(74) *Attorney, Agent, or Firm* — Fay Sharpe LLP

(57) ABSTRACT

Precharging systems and methods are presented for precharging a DC bus circuit in a power conversion system, in which precharging current is connected through a precharging resistance coupled between only a single AC input line and the DC bus circuit when the DC bus voltage is less than a non-zero threshold, and a controller individually activates controllable rectifier switching devices when the DC bus voltages greater than or equal to the threshold using DC gating or pulse width modulation to selectively provide a bypass path around the precharging resistance for normal load currents in the power conversion system.

13 Claims, 6 Drawing Sheets

(56) References Cited

U.S. PATENT DOCUMENTS

| | | |
|---|---|---|
| 4,276,589 A | 6/1981 | Okawa et al. |
| 4,319,177 A | 3/1982 | Kawada et al. |
| 4,496,899 A | 1/1985 | Lippitt et al. |
| 4,545,002 A | 10/1985 | Walker |
| 4,833,389 A | 5/1989 | Kovalk |
| 4,864,483 A | 9/1989 | Divan |
| 4,870,338 A | 9/1989 | Abbondanti |
| 5,005,115 A | 4/1991 | Schauder |
| 5,041,959 A | 8/1991 | Walker |
| 5,083,039 A | 1/1992 | Richardson et al. |
| 5,715,154 A | 2/1998 | Rault |
| 5,798,632 A | 8/1998 | Muljadi |
| 5,933,339 A | 8/1999 | Duba et al. |
| 5,969,957 A | 10/1999 | Divan et al. |
| 6,118,676 A | 9/2000 | Divan et al. |
| 6,157,097 A | 12/2000 | Hirose et al. |
| 6,166,513 A | 12/2000 | Hammond |
| 6,166,929 A | 12/2000 | Ma et al. |
| 6,229,722 B1 | 5/2001 | Ichikawa et al. |
| 6,262,555 B1 | 7/2001 | Hammond et al. |
| 6,275,393 B1 | 8/2001 | Baudelot et al. |
| 6,301,130 B1 | 10/2001 | Aiello et al. |
| 6,377,478 B1 | 4/2002 | Morishita |
| 6,417,644 B2 | 7/2002 | Hammond et al. |
| 6,445,165 B1 | 9/2002 | Malik et al. |
| 6,646,842 B2 | 11/2003 | Pan et al. |
| 6,735,098 B2 | 5/2004 | Hussein et al. |
| 6,828,742 B2 | 12/2004 | Suzuki et al. |
| 7,158,393 B2 | 1/2007 | Schneider |
| 7,233,465 B2 | 6/2007 | Lee |
| 7,312,537 B1 | 12/2007 | Walling |
| 7,432,686 B2 | 10/2008 | Erdman et al. |
| 7,462,946 B2 | 12/2008 | Wobben |
| 7,505,291 B2 | 3/2009 | Wang et al. |
| 7,508,147 B2 | 3/2009 | Rastogi et al. |
| 7,511,385 B2 | 3/2009 | Jones et al. |
| 7,511,975 B2 | 3/2009 | Hammond |
| 7,595,563 B2 | 9/2009 | Wobben |
| 7,656,052 B2 | 2/2010 | Jones et al. |
| 7,663,260 B2 | 2/2010 | Kabatzke et al. |
| 7,679,208 B1 | 3/2010 | Ko et al. |
| 7,692,321 B2 | 4/2010 | Jones et al. |
| 7,692,325 B2 | 4/2010 | Ichinose et al. |
| 7,738,267 B1 | 6/2010 | Tallam et al. |
| 7,746,020 B2 | 6/2010 | Schnetzka et al. |
| 7,755,209 B2 | 7/2010 | Jones et al. |
| 7,816,798 B2 | 10/2010 | Hehenberger |
| 7,880,343 B2 | 2/2011 | Kleinecke et al. |
| 7,929,323 B2 | 4/2011 | Schmidt |
| 7,965,529 B2 | 6/2011 | Gibbs et al. |
| 8,030,791 B2 | 10/2011 | Lang et al. |
| 8,154,895 B2 | 4/2012 | Gilmore |
| 8,223,515 B2 | 7/2012 | Abolhassani et al. |
| 8,816,625 B2 | 8/2014 | Kopiness et al. |
| 2002/0191426 A1 | 12/2002 | Hussein et al. |
| 2003/0035311 A1 | 2/2003 | Phadke |
| 2003/0063481 A1 | 4/2003 | Kojori |
| 2006/0232250 A1 | 10/2006 | Sihler et al. |
| 2008/0074812 A1 | 3/2008 | Oestreich et al. |
| 2008/0186750 A1* | 8/2008 | Gilmore ............... H02M 7/1626 363/129 |
| 2010/0078998 A1* | 4/2010 | Wei ....................... H02M 5/458 363/37 |
| 2010/0080022 A1 | 4/2010 | Schmidt |
| 2011/0038185 A1 | 2/2011 | Swamy et al. |
| 2011/0057444 A1 | 3/2011 | Dai et al. |
| 2011/0057588 A1 | 3/2011 | Rineh et al. |
| 2013/0119903 A1 | 5/2013 | Weiss et al. |
| 2014/0292246 A1* | 10/2014 | Chae ....................... H02P 27/06 318/504 |
| 2014/0300298 A1 | 10/2014 | Liu et al. |

FOREIGN PATENT DOCUMENTS

| | | |
|---|---|---|
| JP | 2002345258 A | 11/2002 |
| WO | WO 2013/094886 A1 | 6/2013 |

OTHER PUBLICATIONS

European Search Report dated Jun. 23, 2016 for Application No. EP 16 15 1221.

* cited by examiner

PRECHARGING APPARATUS AND POWER CONVERTER

BACKGROUND INFORMATION

The subject matter disclosed herein relates to power conversion, and more specifically to precharging circuitry for motor drives and other power converters.

BRIEF DESCRIPTION

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides systems and methods for precharging a DC bus circuit in a power conversion system, wherein precharging current is conducted through a precharging resistance coupled between only a single AC input line and the DC bus circuit when the DC bus voltage is less than a non-zero threshold, and a controller individually activates controllable rectifier switching devices using DC gating or pulse width modulation to selectively provide a current bypass path around the precharging resistance when the DC bus voltage equals or exceeds the threshold.

DETAILED DESCRIPTION

Figure 1:
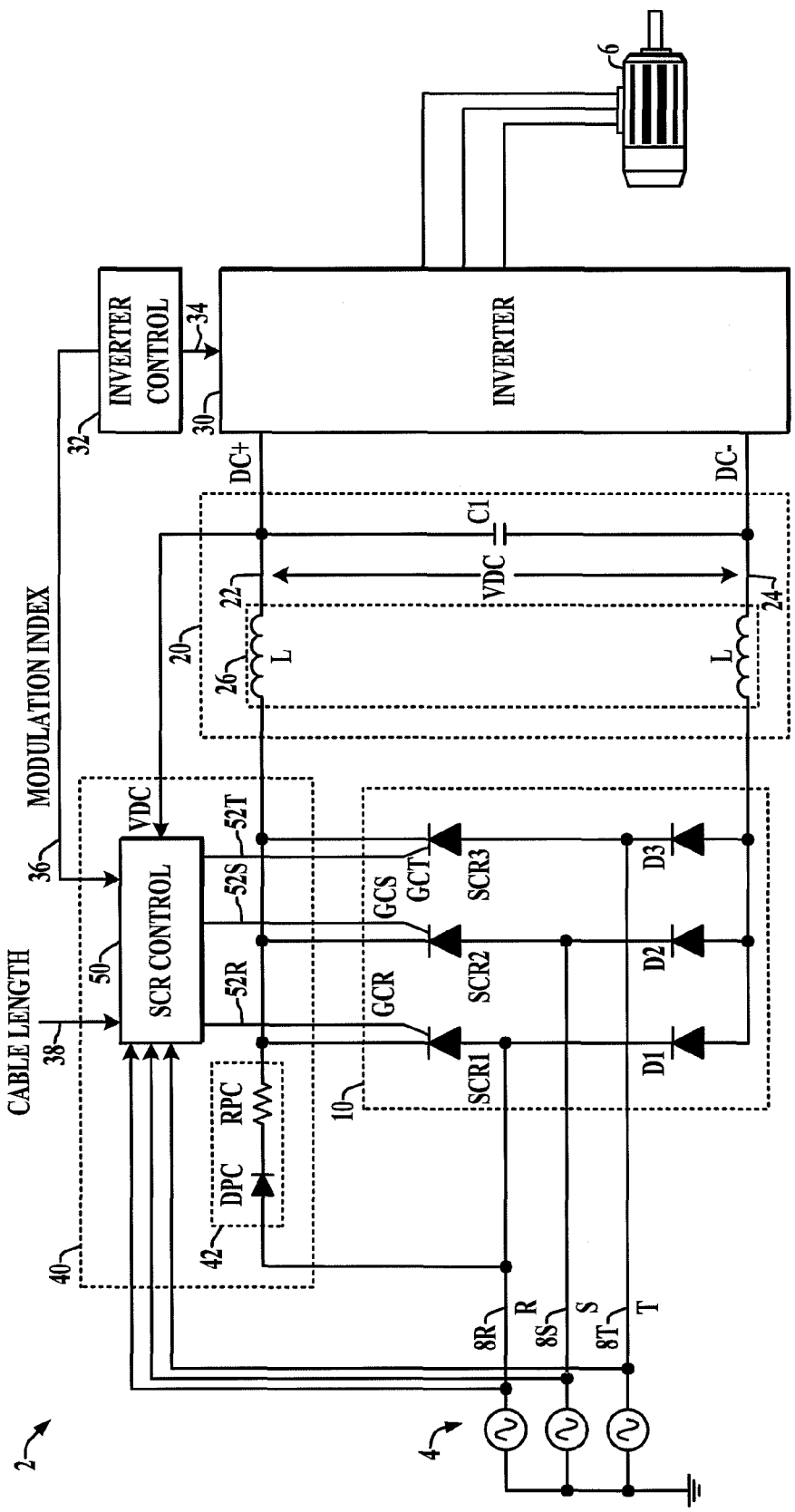
FIG. 1 is a schematic system diagram.
Figure 2:
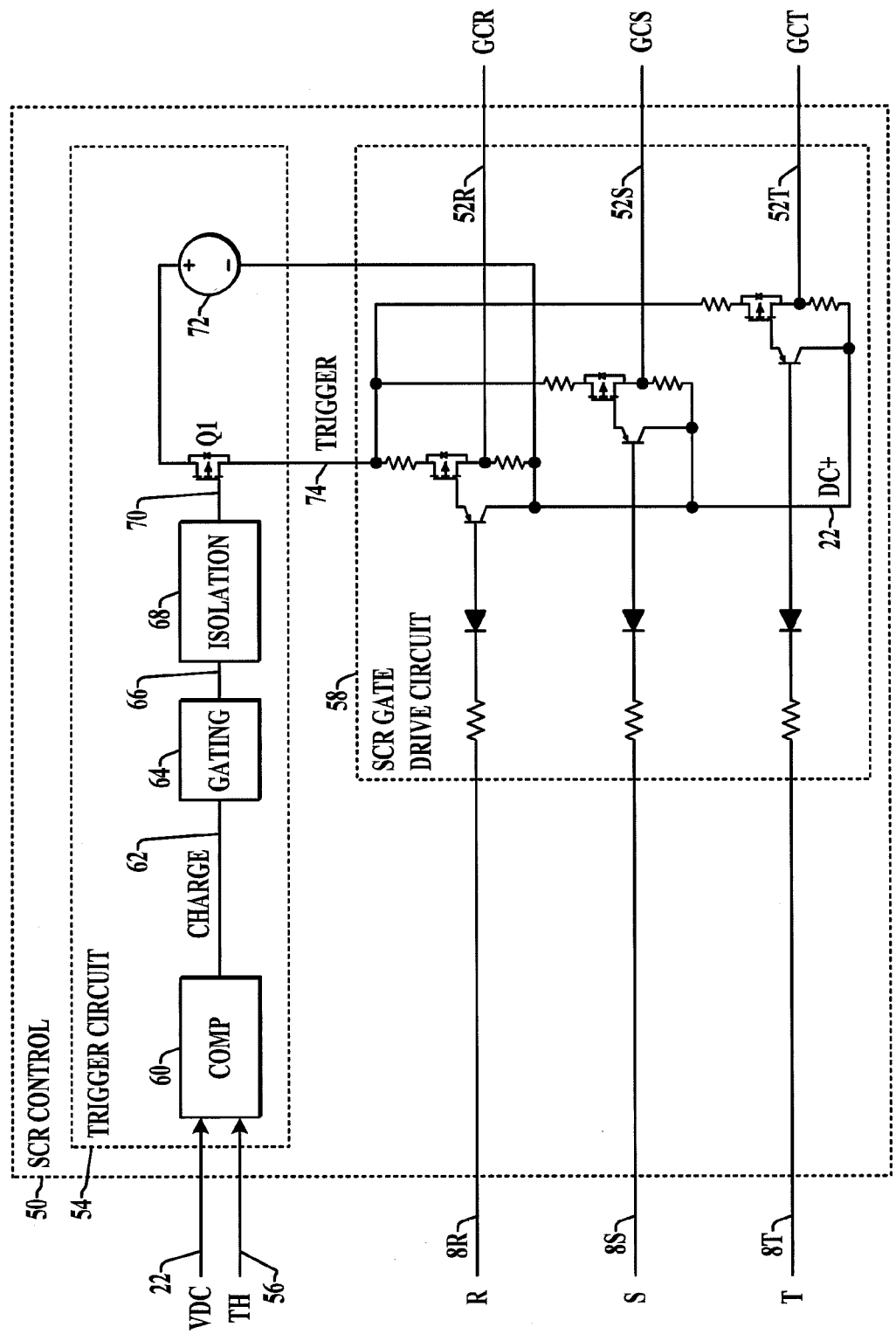
FIG. 2 is a schematic diagram.
Figure 3:
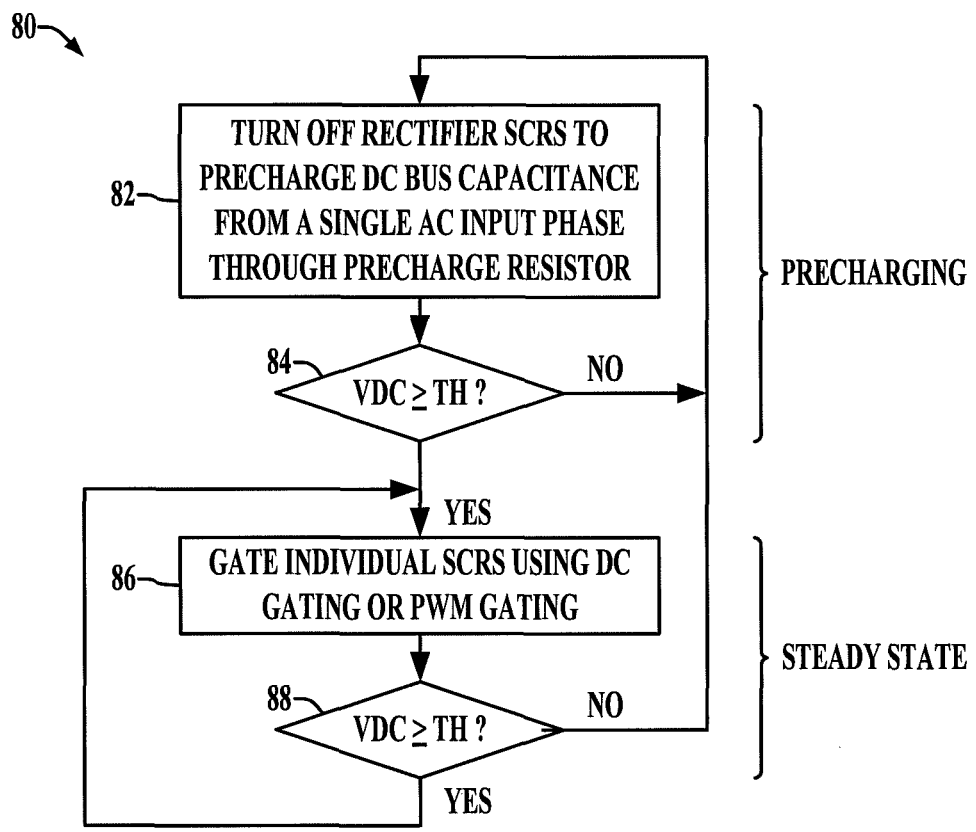
FIG. 3 is a flow diagram.

Referring initially to FIGS. 1-3, FIG. 1 shows a motor drive type power converter or power conversion system 2 receiving AC input power from a multiphase AC power source 4 along AC input lines 8R, 8S and 8T labeled "R", "S" and "T", respectively to provide an AC input to a rectifier circuit 10. The rectifier 10 provides DC output power to an intermediate DC bus circuit 20, and a switching inverter 30 converts DC power from the DC bus circuit 20 to provide variable frequency, variable amplitude multiphase AC output power to drive a motor load 6 according to inverter switching control signals 34 from an inverter controller 32. While the various concepts of the present disclosure are illustrated and described in the context of motor drive type power conversion systems 2, the present disclosure is not limited to motor drives and can be implemented in various forms of power conversion systems having a single or multiphase switching inverter 30 to drive a load 6, including without limitation motor drives, grid-tie converters, wind energy systems, etc. Moreover, the illustrated power conversion system 2 receives a three-phase input, but other multiphase AC input embodiments are possible.

In order to precharge a DC bus capacitance C1 of the DC bus circuit 20 while mitigating excessive charging currents in startup or other precharging conditions, a precharging system 40, 50 is provided in the system 2, along with controllable switching devices SCR1, SCR2 and SCR3 of the rectifier circuit 10. Unlike conventional precharging circuits for multiphase input rectifiers, the precharging system 40 in FIG. 1 includes only a single path for charging the DC bus circuit 20 through a current-limiting resistance RPC. In particular, the system 40, 50 precharges the DC bus circuit 20 by turning off the SCRs of the rectifier 10 and provides only a single precharging conduction path from only a single one of the input phases, in this case input phase "R", via a precharging circuit 42 including a single precharging diode DPC coupled in series with a precharging resistance RPC between the input phase R and the DC bus circuit 20. The resistance RPC can be a single resistor or any suitable series/parallel interconnection of two or more resistors to form a precharging resistance RPC coupled in series with a diode DPC or multiple diodes between a single one of the AC input lines 8 (e.g., 8R in the example of FIG. 1) and the DC bus circuit 20. As shown in FIG. 1, the SCR controller 50 provides gating control signals 52R, 52S and 52T, labeled as GCR, GCS and GCT, to selectively operate the SCRs SCR1, SCR2 and SCR3, respectively. In addition, the controller 50 in one embodiment performs the SCR control functions at least partially according to the DC bus voltage VDC, and optionally according to a modulation index input signal or value 36 from the inverter controller 32 and/or a cable length input 38 as described further in connection with FIGS. 6-11 below.

As further shown in FIG. 1, the rectifier 10 provides SCRs or other controllable rectifier switching devices SCR1, SCR2 and SCR3 individually associated with a corresponding one of the AC input lines 8, and each having an anode coupled with the corresponding AC input line 8 and a cathode coupled with an upper (e.g., positive) DC output node of the rectifier 10. The rectifier 10 further includes diodes D1, D2 and D3 having anodes coupled with a lower (e.g., negative) rectifier output node and cathodes individually coupled with a corresponding one of the AC input nodes 8. Other embodiments are possible in which the lower devices are any suitable form of switchable circuits, including without limitation, rectifier diodes as shown, SCRs, thyristors, etc. Selective operation of the upper rectifier SCRs SCR1, SCR2 and SCR3 in normal steady state operation by the controller 50 facilitate provision of a controlled regulated positive DC bus voltage VDC between DC bus nodes 22 (labeled DC+) and 24 (DC−) across the DC bus capacitance C1 at the output of the intermediate DC bus circuit 20. In certain implementations, the DC bus voltage need not be regulated by operation of the SCRs, with the rectifier circuit 10 essentially acting as a passive rectifier with the additional control of the upper SCRs provided as detailed herein to selectively provide a bypass path for conduction of normal load currents around the precharging resistance RPC. In the illustrated embodiment, moreover, the DC bus circuit 20 includes one or more inductances L, such as a choke 26 coupled between the rectifier output and the DC bus nodes 22 and 24, although not a strict requirement of all implementations of the present disclosure.

FIG. 2 shows an example SCR controller embodiment 50 providing the SCR gating control signals 52 using a trigger circuit or component 54 and a gate drive circuit 58 based at least partially on a threshold voltage value or signal 56, which can be user adjustable or a fixed signal or value in different embodiments. In particular, the threshold 56 represents a non-zero voltage, for example, a non-zero percentage of a nominal DC bus voltage, to which the DC bus circuit is precharged before the SCRs SCR1, SCR2 and SCR3 are selectively actuated by the controller 50. The controller 50 and the inverter controller 32 and the components thereof may be implemented as any suitable hardware, processor-executed software, processor-executed firmware, logic, and/or combinations thereof wherein the illustrated controllers 50 and 32 can be implemented using processor-executed software or firmware providing various control functions by which the inverter controller 32 receives feedback and/or input signals and/or values (e.g., setpoint(s)) and provides inverter switching control signals to provide AC output power to drive the load 6. Furthermore, the controller 50 in certain embodiments operates according to DC bus voltage feedback signals or values 22 (VDC) in order to perform the precharge and rectifier control functionality as set forth herein. In addition, the controllers 50 and 32 and the components thereof can be implemented in a single processor-based device, such as a microprocessor, microcontroller, FPGA, etc., or one or more of these can be separately implemented in unitary or distributed fashion by two or more processors. Furthermore, the SCR controller 50 includes signal conditioning circuitry for providing the gating control signals 52 suitable for actuating the rectifier switching devices SCR1, SCR2 and SCR3.

As shown in FIG. 2, the trigger circuit 54 includes or implements a comparator circuit or function 60 determining whether the DC bus voltage VDC is greater than or equal to the non-zero threshold 56, and accordingly provides a CHARGE output signal or value or message 62 to a gating circuit or function 64. As illustrated further in connection with FIGS. 4 and 6, various different gating circuits or functions 64 can be implemented by the trigger circuit or component 54. In one possible embodiment, the gating circuit or function 64 outputs a gating signal 66 to an isolation circuit 68, such as an optical coupler, pulse transformer, etc., which provides an isolated signal 70 to control a gating transistor Q1, in one example a MOSFET with its drain coupled to a 12 V DC or other suitable voltage supply 72 biased with respect to the upper (e.g., positive) DC bus node 22 (DC+) as shown in FIG. 2.

The source of Q1 provides a trigger or gating control signal 74 (labeled TRIGGER in FIG. 2) as an input to the SCR gate drive circuit 58. When the trigger signal 74 is asserted (HI at a voltage approximately equal to the voltage of the supply 72 in the illustrated embodiment with respect to the upper DC bus node 22), the SCR gate drive circuit 58 actuates the gate control signal 52 corresponding to the input phase line 8 having the highest voltage at any given time among the three input phases R, S and T. In certain embodiments, a corresponding gating control signal GCR, GCS or GCT is provided by the drive circuit 58 to actuate a corresponding one of the rectifier SCRs for at least a portion of the AC input power cycles when the corresponding AC input line 8 has a positive voltage, where this portion may be 180°, or only approximately 120° when the corresponding input line 8 has the highest voltage of the three input lines 8. It is further noted in FIG. 2 that when the CHARGE signal or value 62 is not asserted (e.g., when VDC is less than TH), the trigger signal 74 is not asserted, and all of the gating signals 52 are provided such that the rectifier SCRs are all off.

FIG. 3 illustrates a non-limiting example process or method 80 for precharging a DC capacitance in a power conversion system, which can be implemented in the system 2 via the SCR controller 50 in one embodiment. At 82, the controller 50 provides the gating control signals 52 in a first mode (precharging phase) in order to turn off the rectifier SCRs in order to allow precharging of the DC bus capacitance from a single AC input phase through a precharge resistor. For example, the system 2 of FIG. 1 provides the precharging circuit 42 having a precharging resistance RPC coupled between the DC bus circuit 20 and only a single AC input line 8R via a single precharge diode DPC with an anode connected to the input line 8R and a cathode connected to the precharging resistance RPC. The controller 50 determines at 84 in FIG. 3 whether the DC bus voltage VDC is greater than or equal to the non-zero threshold TH, for example, via the comparator circuit or function 60 comparing the DC bus voltage feedback signal or value 22 with the threshold signal or value 56 as shown in FIG. 2. Where the DC bus voltage is less than the non-zero threshold 56 (NO at 84 in FIG. 3), the controller 50 continues to turn off the rectifier SCRs and precharge the DC bus capacitance at 82 for precharging operation of the system 2. Although the example of FIG. 1 provides a precharging path from the AC input line 8R through the precharging resistance RPC to the DC bus circuit 20, other embodiments are possible in which a single precharging path is provided through the resistance RPC from a single one of the other AC input lines 8S or 8T.

Once the DC bus voltage VDC is greater than or equal to the threshold 56 (YES at 84 in FIG. 3), the controller 50 provides the rectifier switching control signals 52 at 86 in FIG. 3 to individually turn on given ones of the rectifier SCRs for at least a portion of the AC input power cycles when a corresponding AC input line 8 has a positive voltage. This provides steady state operation in a second mode, with the controller 50 determining at 88 whether the DC bus voltage remains at or above the threshold. If the DC bus voltage falls below the threshold (NO at 88), the process returns for precharging operation in the first mode at 82 and 84 as described above. Otherwise (YES at 88), the controller continues the individual SCR gating at 86 for steady state operation in the second mode when the DC bus voltage VDC is greater than or equal to the threshold 56.

In this manner, when the DC bus voltage meets or exceeds the threshold during steady state operation at 86 in FIG. 3, the controller 50 actuates individual SCRs of the rectifier 10 to selectively provide a bypass path around the precharging resistance RPC for conduction of normal load currents in the system 2. In particular, the inventors have appreciated that common mode currents and other common mode noise are particularly problematic for motor drive power conversion systems operated at low modulation index and/or long cable lengths. In this regard, the system 2 may be provided with one or more switchable capacitor banks (not shown), for example, to couple the AC input lines 8 with a ground connection, and/or to couple a center node joining a divided DC bus capacitance with a ground connection in order to provide a low impedance path for return of common mode currents to avoid or mitigate return of such common mode currents to the power source 4 for systems in which the neutral of the source 4 is grounded. Such common mode capacitances or capacitor banks are sometimes used in practice, particularly for very low inverter output frequencies (e.g., low motor speeds) in combination with high pulse width modulation frequency operation of the inverter 28 and long cable lengths 38, in which relatively large common mode currents can conduct, and the selective provision of such capacitor banks or common mode capacitances facilitate power conversion system operation in a variety of situations for easy tailoring to a given end use application. However, other system configurations exist, such as high resistance grounding (HRG) connections, floating system configurations, etc., in which such switchable capacitor banks are disconnected or not included.

At low motor speeds, long cable lengths and relatively high inverter operating frequencies, the AC input line currents are typically low, and may not be enough to latch the rectifier SCRs in the on state. In this condition, moreover, if the common mode current returns back through the power source 4 or to the AC input lines through any connected AC input capacitors, and the upper rectifier SCRs SCR1, SCR2 and SCR3 are not latched on, the common mode current returns through the precharge resistance RPC, which can lead to overheating of the precharging resistance RPC. In such circumstances, the inventors have appreciated that provision of a precharging circuit 42 having connection to only one of the AC input lines (e.g., 8R in the example of FIG. 1) advantageously restricts the amount of such common mode current conduction through the precharging resistance RPC, since this common mode current will only conduct over a portion of each AC input cycle, whereas precharging circuitry having precharge diodes connecting the precharging resistance to all three input phase lines 8 increases the amount of common mode current flow through the precharging resistance RPC. As a result, application of the concepts of the present disclosure during steady state operation when the DC bus voltage VDC is charged to or above the threshold value 56 facilitates reduction in the size of the precharging resistance RPC and/or mitigates or reduces the possibility of precharging resistance overheating and/or the need for cooling apparatus to prevent such overheating.

Referring now to FIGS. 4-11, the controller 50 also advantageously provides the rectifier switching control signals 52 in order to activate the rectifier SCRs using a variety of techniques, including without limitation DC gating and/or pulse width modulation to selectively provide a bypass conduction path for normal load current flow in order to reduce or mitigate the amount of currents flowing through the precharging resistance RPC. The combination of the precharging via only a single AC input line 8 and the selective gating of the rectifier SCRs using DC gating or PWM gating provides a novel solution for combating precharging resistance overheating while mitigating or avoiding the need for oversizing the precharging resistance wattage rating and/or cooling apparatus within the power conversion system 2.

Figure 4:
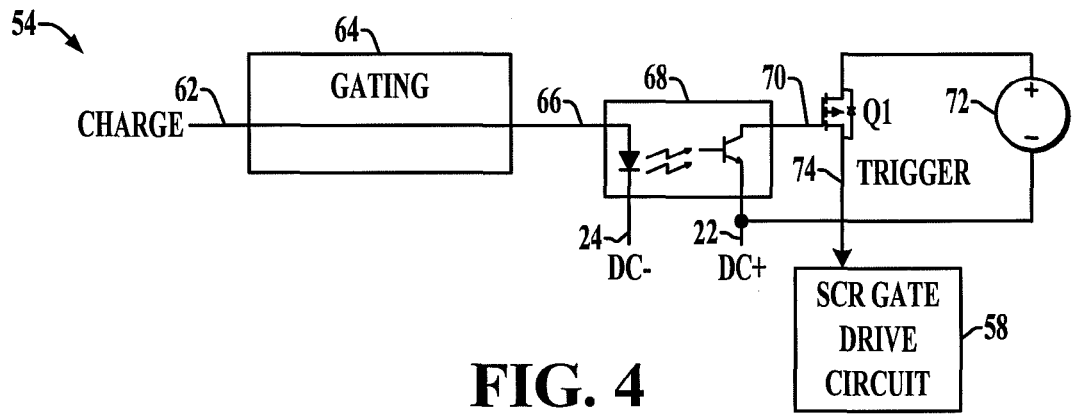
FIG. 4 is a schematic diagram.
Figure 5:
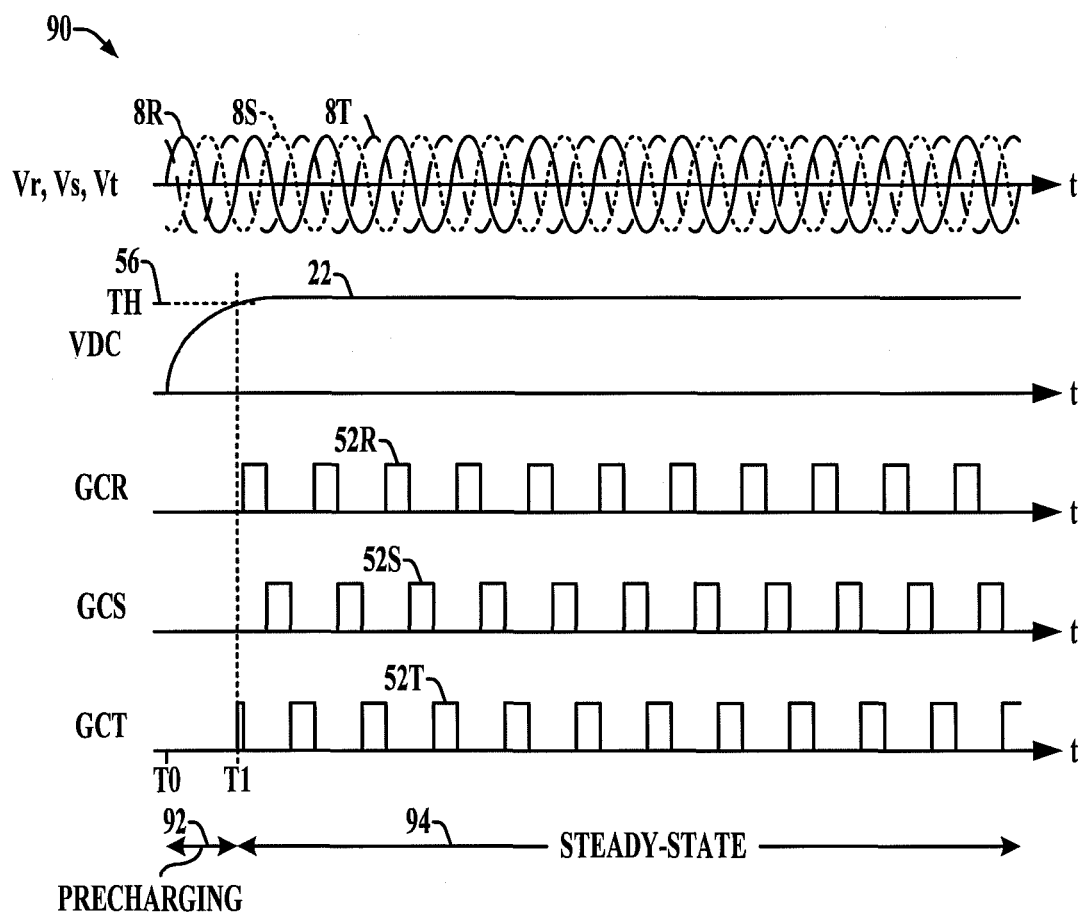
FIG. 5 is a graph.

FIGS. 4 and 5 illustrate an embodiment in which the trigger circuit or component 54 of the SCR controller 50 provides DC gating during steady state system operation when the DC bus voltage VDC is greater than or equal to the non-zero threshold 56. As seen in FIG. 4, when the CHARGE signal 62 is active high, the gating circuit or component 64 provides a continuous signal 66 to the isolation circuit 68 (e.g., an opto-isolator circuit), with the gating signal 66 being referenced to the negative DC bus node 24 (DC−) in this example. Other embodiments are possible in which the gating signal 66 is referenced to other nodes, including without limitation, ground. The output of the isolation circuit 68 provides a signal 70 referenced with respect to the positive DC bus node 22 (DC+) in order to activate Q1 and thus provide a high trigger signal 74 to the SCR gate drive circuit 58. FIG. 5 illustrates a graph 90 showing AC input line voltages Vr, Vs and Vt at the AC input lines 8R, 8S and 8T, as well as a graph showing the DC bus voltage VDC at the DC+ node 22 relative to the non-zero threshold TH 56, along with gating signal waveforms 52R, 52S and 52T provided by the SCR gate drive circuit 58 (GCR, GCS and GCT).

As seen in the graph 90, the controller 50 initially implements a precharging operation or phase 92 in a first operating mode (e.g., at 82 and 84 in FIG. 3 above) during which the SCR gating control signals 52 are low thereby turning off the rectifier SCRs SCR1, SCR2 and SCR3. This precharging phase 92 continues from an illustrated start time T0 until a time T1 at which the DC bus voltage VDC reaches the threshold TH 56, thereby placing the controller 50 in the second mode. At this point, the trigger signal 74 is activated by the trigger circuit or component 54, and the SCR gate drive circuit 58 begins individually providing the rectifier switching control signals 52 to individually turn on given rectifier SCRs for at least a portion of AC input power cycles when the corresponding AC input line 8 has the highest positive voltage, thereby selectively providing a bypass path around the precharging resistance RPC for conduction of normal load currents in the power conversion system 2.

In the illustrated example of FIG. 5, for instance, the individual gating pulses 52 extend approximately 120° out of each 360° AC input cycle corresponding to the portion during which the corresponding AC input line voltage is the highest of the three AC input phases. As seen in FIG. 5, moreover, the gating component or function 64 in this example operates to individually turn on the given rectifier switching devices continuously for a single portion of each AC input cycle when the corresponding AC input line has the highest positive voltage in the second mode 94 (steady state operation when VDC is greater than or equal to the threshold 56). This DC gating implementation advantageously provides a high level of common mode current bypassing of the precharging resistance RPC, and implementation of this is relatively straightforward via the gating circuit or function 64 of the trigger circuit or component 54.

Figure 6:
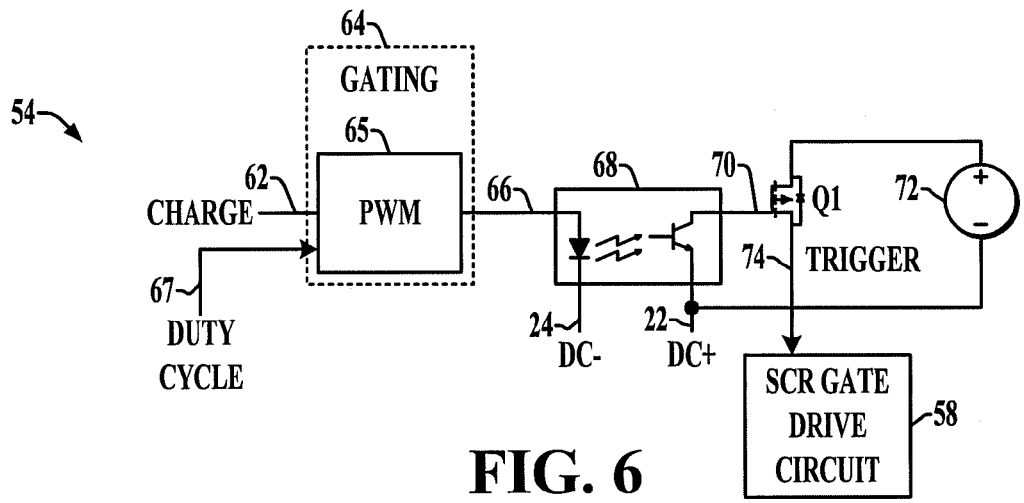
FIG. 6 is a schematic diagram.
Figure 7:
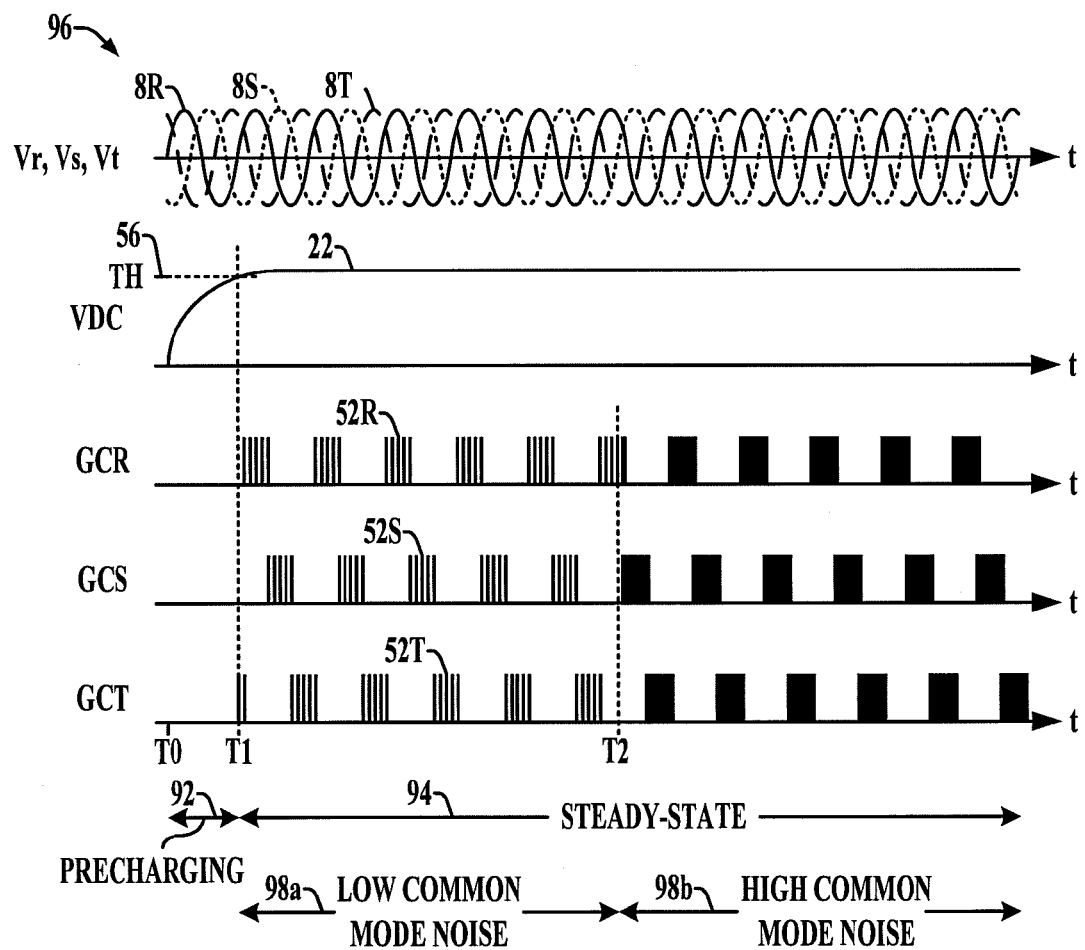
FIGS. 7-11 are graphs.

As seen in FIGS. 6-11, further embodiments of the trigger circuit or component 54 provide a gating circuit or function 64 with a pulse width modulation (PWM) circuit or component 65. As seen in FIG. 6, the PWM component 65 in one example receives the charge input signal 62 indicating that the DC bus voltage VDC is greater than or equal to the threshold 56, and the PWM circuit or function 65 may operate according to an adjustable duty cycle input signal or value 67. The duty cycle input 67 may be provided by a variety of sources, such as a predetermined value stored in a memory of the controller 50 or a fixed circuit providing a duty cycle signal of a fixed voltage or other suitable means. The PWM circuit 65 provides the gating output signal 66 to the isolation circuit 68 as a series of pulses at any suitable frequency with a fixed or adjustable pulse width or duty cycle. The graph 96 in FIG. 7 illustrates operation of this embodiment where the gating control signals 52 provided by the gate drive circuit 58 are pulse width modulated pulse signals to individually turn on and off the corresponding rectifier SCRs for the portion of the AC input power cycles when the corresponding AC input line 8 has the highest positive voltage. In the implementation of FIG. 2, the pulse signal waveforms provided as the gate control signals 52 result from the PWM pulse signal waveform of the trigger signal 74 from the trigger circuit or component 54 by operation of the PWM circuit 65 in FIG. 6.

As further shown in FIG. 7, moreover, certain embodiments provide for adjustment of the pulse width or duty cycle of the PWM gate control signals 52, for example, through adjustment of the duty cycle input 67 provided to the PWM circuit 65 in FIG. 6. In particular, this adjustable duty cycle approach facilitates adjustment of the on-times of the SCRs to accommodate different common mode noise levels or situations in the power conversion system 2. Thus, in FIG. 7, the SCR duty cycles are provided at a first level for low common mode noise conditions during a first illustrated portion 98a of the steady state operation phase 94, and the duty cycles are increased for high common mode noise situations during a second illustrated portion 98b starting at time T2 in FIG. 7. Consequently, the controller 50 advantageously operates to bypass more common mode current around the precharging resistance RPC on a generally as-needed basis.

Figure 8:
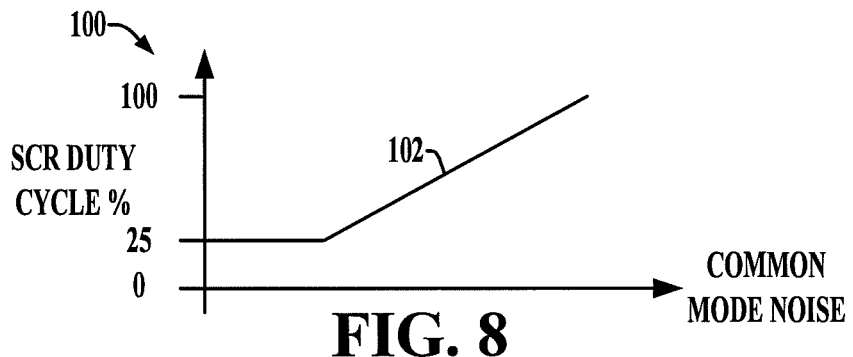
Figure 9:
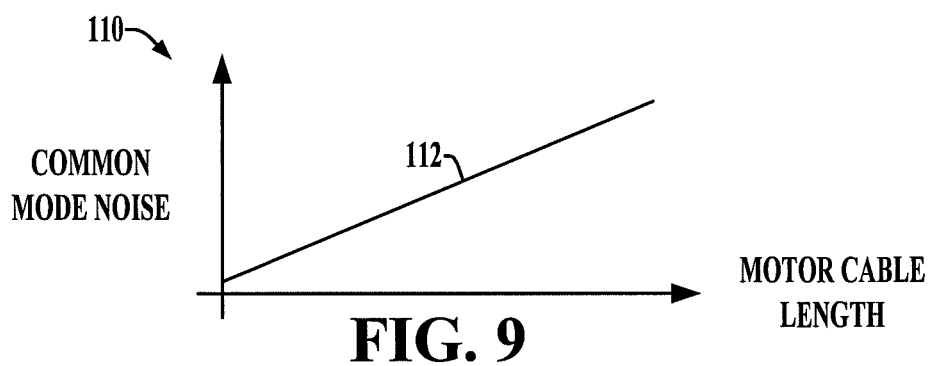
Figure 10:
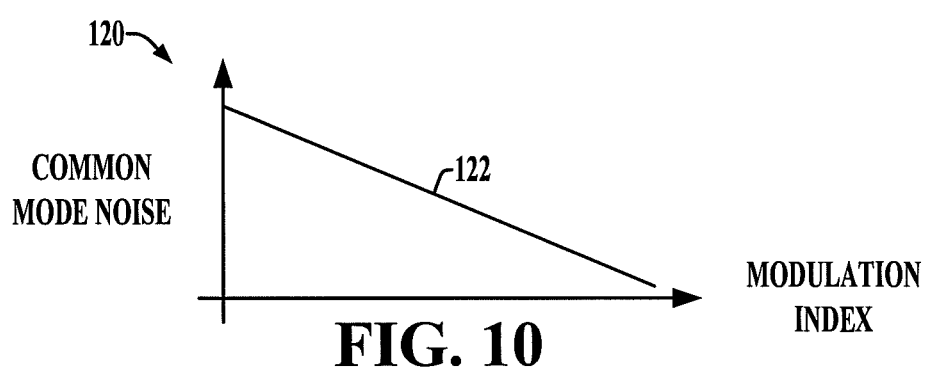

FIGS. 8-11 further illustrate a variety of self-adjustment concepts which can be implemented in various embodiments of the controller 50 in order to adjust the SCR gate control signal duty cycles according to the amount of common mode noise in the system 2. A graph 100 is provided in FIG. 8 showing an SCR duty cycle percentage curve 102. This illustrates one implementation in the controller 50, in which a nominal SCR duty cycle of 25% is provided over a first range of relatively low common mode noise conditions in the system 2, with the duty cycle being generally linearly increased with increasing system common mode noise. A graph 110 is shown in FIG. 9 including a common mode noise curve 112 as a function of motor cable length, showing that the amount of common mode noise increases with increasing motor cable length. In addition, the graph 120 in FIG. 10 illustrates a common mode noise curve 122 as a function of inverter operating modulation index, wherein the system common mode noise decreases with increasing modulation index.

Figure 11:
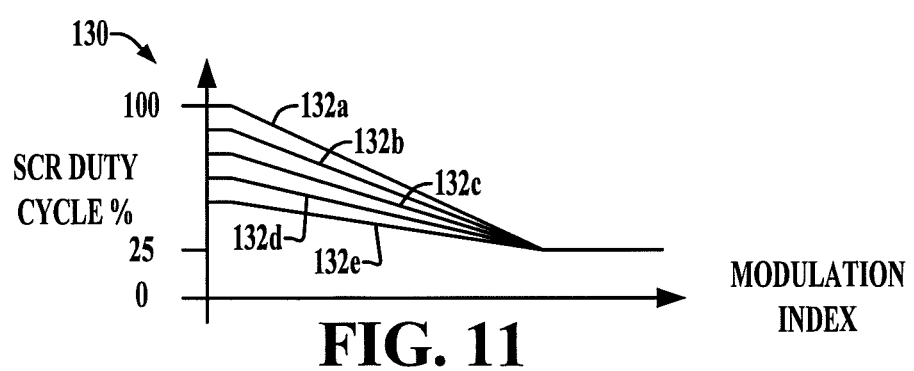

Referring also to FIGS. 1 and 11, the inventors have thus appreciated that automatic or self-adjusting duty cycle control can be provided via the controller 50 according to one or both of these parameters, to thereby adjust the SCR duty cycle based on common mode noise levels in the system 2 without having to directly measure or estimate actual common mode noise conditions at any given time. In particular, as seen in FIG. 1, the SCR controller 50 may be provided with a value or signal 38 representing the cable length for a given power conversion system installation, and the inverter controller 32 may provide the SCR controller 50 with a signal or value 36 representing the current modulation index used in operating the output inverter 30.

A graph 130 in FIG. 11 illustrates a series of curves 132a, 132b, 132c, 132d and 132e showing SCR duty cycles (%) as a function of inverter operating modulation index, with each of the curves 132 corresponding to a different cable length value 38 received by the SCR controller 50. In this example, the curve 132a corresponds to a very long cable length, and the curves 132b-132e correspond to successively shorter cable lengths. In this implementation, the controller 50 receives a cable length value 38 for a given installation of the power conversion system 2, and stores this in an electronic memory, and the controller 50 may be updated with different cable length values where the actual cable length is changed. Based on the cable length value 38, the controller 50 employs a corresponding one of the curves 132 via a lookup table or the controller 50 may implement a parametric computation corresponding to the curves 132 shown in FIG. 11, in order to derive an SCR duty cycle based on the most recent modulation index value 36 employed by the inverter controller 32, in order to set the duty cycle input 67 provided to the PWM circuit 65 in FIG. 6.

As seen in FIG. 11, moreover, the example curves 132 provide a minimum nominal duty cycle percentage of approximately 25%, with this percentage being used even for potentially large modulation index values, although not a strict requirement of all possible embodiments. In addition, the illustrated curves 132 provide a generally flat or constant modulation SCR duty cycle value for a small range of very low modulation index values, although this aspect of the illustrated examples is not required in all embodiments. Between these constant duty cycle ranges for high and low modulation index values, the curves 132 in FIG. 11 provide generally linear decreases in the SCR duty cycle percentage with increasing modulation index values. Any suitable curve, whether implemented by parametric equation solution and/or lookup table, etc., and whether linear, curvilinear, piecewise linear, or any other shape, can be used in implementing an adjustable rectifier SCR duty cycle adjustment based at least partially on common mode noise in the system 2. Moreover, such embodiments may set the duty cycle of the PWM pulses 52 at least partially according to a modulation index 36 used in controlling the inverter 30 and/or at least partially according to a cable length 38 of the power conversion system 2.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". This description uses examples to disclose various embodiments and also to enable any person skilled in the art to practice the disclosed subject matter, including making and using any devices or systems and performing any incorporated methods. It will be evident that various modifications and changes may be made, and additional embodiments may be implemented, without departing from the broader scope of the present disclosure as set forth in the following claims, wherein the specification and drawings are to be regarded in an illustrative rather than restrictive sense.

The invention claimed is:

1. A system for precharging a DC bus circuit disposed between a multiphase input rectifier and an inverter of a power conversion system, comprising:
   a precharging circuit, including:
      a precharging resistance coupled between the DC bus circuit and only a single one of a plurality of AC input lines, the precharging comprising a first terminal coupled with the DC bus circuit and a second terminal, and
      a single precharging diode with an anode connected to the single one of the plurality of AC input lines, and a cathode connected to the second terminal of the precharging resistance; and
      a controller operative in a first mode when a DC bus voltage is less than a non-zero threshold to provide rectifier switching control signals to turn off a plurality of rectifier switching devices of the rectifier for precharging the DC bus circuit, and in a second mode when the DC bus voltage is greater than or equal to the non-zero threshold to provide the rectifier switching control signals to individually turn on given ones of the rectifier switching devices for at least a portion of AC input power cycles when a corresponding AC input line has a positive voltage to selectively provide a bypass path around the precharging resistance for normal load currents in the power conversion system;

wherein the controller provides the rectifier switching control signals as pulse width modulated (PWM) pulse signals to individually turn on and off given ones of the rectifier switching devices for the portion of AC input power cycles when the corresponding AC input line has a positive voltage in the second mode; and wherein the controller sets a duty cycle of the PWM pulse signals at least partially according to an amount of common mode noise in the power conversion system.

2. The system of claim 1, wherein the controller sets a duty cycle of the PWM pulse signals at least partially according to a modulation index used in controlling the inverter of the power conversion system.

3. The system of claim 2, wherein the controller sets the duty cycle of the PWM pulse signals at least partially according to a cable length of the power conversion system.

4. The system of claim 1, wherein the controller sets a duty cycle of the PWM pulse signals at least partially according to a cable length of the power conversion system.

5. A power conversion system, comprising:
a rectifier comprising a plurality of rectifier switching devices individually coupled between a first rectifier DC output node and a corresponding one of a plurality of AC input lines;
an inverter with first and second inverter inputs for receiving DC input power, and an inverter output for providing AC output power to drive a load;
a DC bus circuit coupled between the first rectifier DC output node of the rectifier and the first and second inverter inputs of the inverter, the DC bus circuit comprising at least one capacitance; and
a precharging system for precharging the DC bus circuit, comprising:
a precharging circuit, including:
a precharging resistance coupled between the DC bus circuit and only a single one of a plurality of AC input lines, the precharging comprising a first terminal coupled with the DC bus circuit and a second terminal, and
a single precharging diode with an anode connected to the single one of the plurality of AC input lines, and a cathode connected to the second terminal of the precharging resistance, and
a controller operative in a first mode when a DC bus voltage of the DC bus circuit is less than a non-zero threshold to provide rectifier switching control signals to turn off the plurality of rectifier switching devices of the rectifier for precharging the DC bus circuit, and in a second mode when the DC bus voltage is greater than or equal to the non-zero threshold to provide the rectifier switching control signals to individually turn on given ones of the rectifier switching devices for at least a portion of AC input power cycles when a corresponding AC input line has a positive voltage;

wherein the controller provides the rectifier switching control signals as pulse width modulated (PWM) pulse signals to individually turn on and off given ones of the rectifier switching devices for the portion of AC input power cycles when the corresponding AC input line has a positive voltage in the second mode; and wherein the controller sets a duty cycle of the PWM pulse signals at least partially according to an amount of common mode noise in the power conversion system.

6. The power conversion system of claim 5, wherein the DC bus circuit comprises an inductance coupled between the first rectifier DC output node and the first inverter input.

7. The power conversion system of claim 5, wherein the controller sets a duty cycle of the PWM pulse signals at least partially according to a modulation index used in controlling the inverter of the power conversion system.

8. The power conversion system of claim 7, wherein the controller sets the duty cycle of the PWM pulse signals at least partially according to a cable length of the power conversion system.

9. The power conversion system of claim 5, wherein the controller sets a duty cycle of the PWM pulse signals at least partially according to a cable length of the power conversion system.

10. A method for precharging a DC bus capacitance in a power conversion system, the method comprising:
when a DC bus voltage is less than a non-zero threshold, turning off a plurality of rectifier switching devices of the rectifier and precharging the DC bus capacitance through only a single precharging resistance coupled between a DC bus circuit and only a single one of a plurality of AC input lines;
when the DC bus voltage is greater than or equal to the non-zero threshold, individually turning on given ones of the rectifier switching devices for at least a portion of AC input power cycles when a corresponding AC input line has a positive voltage to selectively provide a bypass path around the precharging resistance for normal load currents in the power conversion system;
providing rectifier switching control signals as pulse width modulated (PWM) pulse signals to individually turn on and off given ones of the rectifier switching devices for the portion of AC input power cycles when the corresponding AC input line has a positive voltage in the second mode; and
setting a duty cycle of the PWM pulse signals at least partially according to an amount of common mode noise in the power conversion system.

11. The method of claim 10, comprising setting the duty cycle of the PWM pulse signals at least partially according to a modulation index used in controlling an inverter of the power conversion system.

12. The method of claim 11, comprising setting the duty cycle of the PWM pulse signals at least partially according to a cable length of the power conversion system.

13. The method of claim 10, comprising setting the duty cycle of the PWM pulse signals at least partially according to a cable length of the power conversion system.

* * * * *